Patented Aug. 7, 1951

2,562,953

UNITED STATES PATENT OFFICE 2,562,953

ORGANO-SILICON COPOLYMERS AND PROCESS OF MAKING SAME

John B. Rust, East Hanover, N. J., assignor, by direct and mesne assignments, of one-half to Montclair Research Corporation, a corporation of New Jersey, and one-half to Ellis-Foster Company, a corporation of New Jersey No Drawing. Application March 6, 1947,
Serial No. 732,937

6 Claims. (Cl. 260—46.5)

This invention relates to copolymers of organic substituted silicon derivatives, to methods of making such products, and to their utilization.

It is known that esters of silicic acid may be hydrolyzed to form first, a coherent, glassy mass and then a silica sand on further removal of the alkoxy groups and dehydration. It is also known that alkyl silicon hydroxides will polymerize on dehydration to produce hard resins if the alkyl radical ratio to silicon is sufficiently low. But there are limitations in such procedures to the character of products that can be obtained and properties desired in such products.

Among the objects of the present invention is the production of homogeneous, composite copolymers particularly of resinous character composed of copolymerization products of an organic substituted silicon derivative and related materials.

Further objects include the production of such copolymerization products by the utilization of relatively inexpensive materials such as esters of orthosilicic acid and acyl silicons to give stable, coherent resinous products having high heat stability, good color and chemical resistance.

Further objects include the production of hard resinous materials from an organo-oxy silicon such as an alkoxy silicon, or an acyl silicon and a non-resinifying alkyl silicon derivative.

Still further objects and advantages of the present invention will appear from the more detailed description set forth below, it being understood that such detailed description is given by way of illustration and explanation only, and not by way of limitation, since various changes therein may be made by those skilled in the art without departing from the scope and spirit of the present invention.

This application is a continuation-in-part of application Serial No. 541,846, filed June 23, 1944, entitled "Silica-Containing Copolymers and Process of Making Same."

In accordance with the present invention, copolymerization products are produced from a silica derivative, such as an orthosilicate or related compound, reacted with an organic substituted silicon derivative such as an oxysilicon having an organic group attached directly to silicon or related compound, so that copolymerization products are produced in which relatively inexpensive materials may be utilized in the production of stable, coherent resinous products having high heat stability, good color and chemical resistance. While the production of resinous products of this character is particularly emphasized herein, other types of materials may also be produced by variation in the nature of the reactants employed in the copolymerization process. Various methods and materials may be utilized to produce the copolymerization products of the present invention, all leading, however, to substantially the same results subject to specific variations under particular conditions.

Generally the reaction products of the present invention are produced from a silica derivative or more particularly an orthosilicate derivative reacted with an oxysilicon having an organic group attached directly to silicon.

The silica derivative employed is desirably an orthosilicate and may be looked upon as derived from orthosilicic acid $Si(OH)_4$, in which the hydrogen of the orthosilicic acid has been substituted by an organic group. Such substituting organic group may be one that produces an ester of the orthosilicic acid or it may be an acyl group of a carboxy acid producing an acylate. Such compounds may be generally formulated as $Si(OW')_4$, where W' is R representing any ester forming group when substituted in the formulation, or may be the acyl group COR. Thus the esters of orthosilicic acid would be generally represented by the formulation $Si(OR)_4$. The acylates would be generally represented by the formulation $Si(O.COR)_4$. The values of R in these formulations will be set forth below.

Instead of using an orthosilicate as set forth above, a hydrolysis product of a silicon tetrahalide may be employed, particularly when such hydrolysis product is produced in the presence of, or by cohydrolysis with an oxysilicon having an organic group attached directly to silicon, such as a siliconate referred to below. The tetrahalide employed may be for example, the chloride or bromide. Hydrolysis of such halides leads to silica derivatives which may be utilized herein.

The second component in the production of the copolymeric materials is an oxysilicon having an organic group attached directly to silicon and includes particularly organic substituted orthosiliconates, organic substituted silicon hydroxides, and organic substituted silicon acylates. They may be generally formulated as

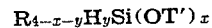

$$R_{4-x-y}H_ySi(OT')_x$$

where T' is hydrogen, or an organic radical R, or an acyl group COR, $x$ is from 1 to 3, $y$ is from 0 to 2, and $x+y$ is not greater than 3. The values of R in this formulation will be illustrated below.

The organic orthosiliconates per se would be generally formulated as $R_{4-x-y}H_ySi(OR)_x$ where R has the values set forth below, $x$ is from 1 to 3, $y$ is from 0 to 2, and $x+y$ is not greater than 3; or as $R_{4-x}Si(OR)_x$, where R has the values set forth below and $x$ is from 1 to 3. They are represented below particularly by organic substituted orthosiliconates, alkyl alkoxy silicons, etc. The organic substituted silicon acylates utilized for this purpose would be represented by the formulation $R_{4-x-y}H_ySi(O.COR)_x$, where R has the values set forth below, $x$ is from 1 to 3, $y$ is from 0 to 2, and $x+y$ is not greater than 3; or by the formulation $R_{4-x}Si(O.COR)_x$, where R has any of the meanings set forth below and $x$ is from 1 to 3. The COR group represents an acyl group of a carboxy acid which may be aliphatic such as fatty acid, aromatic such as benzoic acid, etc., or the acyl groups derived therefrom.

The organic substituted silicon hydroxides utilized for this purpose would be generally formulated as $R_{4-x-y}H_ySi(OH)_x$, where R has the values set forth below, $x$ is from 1 to 3, $y$ is from 0 to 2, and $x+y$ is not greater than 3, or $R_{4-x}Si(OH)_x$, where R has the values set forth below and $x$ is from 1 to 2. Compounds where three hydroxy groups would be present on the silicon usually break down to split off water and give a condensed product but they may be generally included by having $x$ equal to 1 to 3 in the above formulation.

The values of R in the above given formulations may be selected from a variety of organic radicals including aliphatic radicals such as alkyl, alkynyl, alkenyl, alkanyl, olefinyl, etc., or carbocyclic radicals including the aromatic radicals particularly the aryls, aralkyl and alkaryl radicals, etc., or the substituent group may be a cycloaliphatic group or alicyclic group such as cyclohexyl, etc. R may thus be selected from any of the stated groups and one or more of such groups may be present in mixed derivatives having the formulations set forth above in that R may be the same or different groups in a given compound to produce such mixed derivatives. While mono-silicon derivatives have been particularly emphasized above and illustrated, the poly-silicon derivatives may be utilized such as disilicon hexa-acetate, disilicon hexachloride, hexa ethoxy siloxane having the formula $Et_6Si_2O_7$, and the like, trisilicon and polysilicon compounds, and siloxane derivatives may in general be employed. As illustrative of specific substituent organic radicals that may be utilized within those just given above there may be mentioned methyl, ethyl, propyl, isopropyl, butyl, isobutyl, amyl, hexyl, heptyl, octyl, nonyl, decyl, etc., including the higher alkyls, unsaturated groups like vinyl, allyl, methallyl, aryl groups such as phenyl, tolyl, alphyl groups such as benzyl, cycloaliphatic such as cyclohexyl, and so forth.

While thus a variety of compounds may be utilized for each of the reactants referred to above, it is not to be assumed that the same product is obtained by utilization of the many different derivatives that are available for reaction in accordance with the present invention. The properties and characteristics of these copolymers will vary considerably depending on the nature of the ingredients employed but in general hard resinous copolymers may be produced utilizing any of the derivatives set forth above in accordance with the present invention.

And while the invention will be illustrated below in connection with the reaction of one silica derivative as set forth above with one organic substituted silicon derivative, it is to be understood that various mixtures of each of these different types of compounds may be utilized in producing reaction products the complexity of which will thus be greatly increased depending on the selection of reactants employed. Thus the esters of orthosilicates may be employed together with silicon tetro-acylates in admixture for reaction with either one or a number of the oxysilicons having an organic group attached directly to silicon such as the organic orthosiliconates, the organic silicon hydroxides, the organic silicon acylates, etc., all as given above. Or mixtures of the oxysilicons having an organic group attached directly to silicon, such as the organic orthosiliconates, organic silicon hydroxides and organic silicon acylates may be utilized for reaction with one or more of the silica derivatives as set forth above. Since the alkyl and aryl groups represent the more readily available compounds for utilization, they will be employed herein for illustrating the invention by a number of examples without indicating any limitation thereto. For convenience also since no other term is available for that purpose, the term arkyl will be used as generic to alkyl and aryl groups.

The following formulations illustrate the reacting components and general process mechanism of the present invention but are offered only as a possible mechanism and no limitation on the invention set forth herein is to be interpolated in view of these suggested formulations, or in view of other theoretical considerations.

Such representative formulations are the following:

(A)
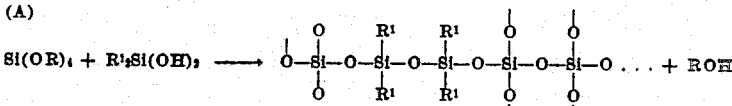

(B)
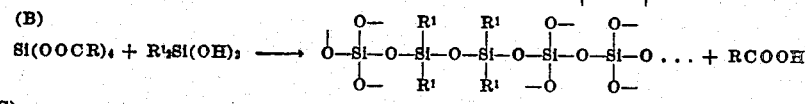

(C)
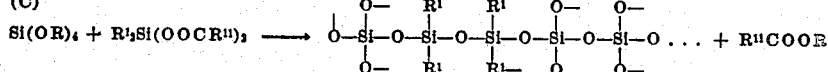

(D)
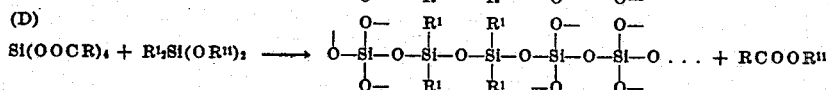

(E)
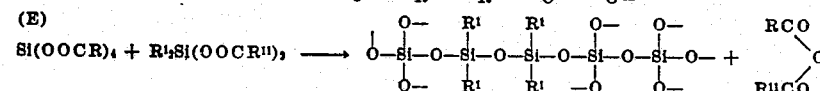

(F)
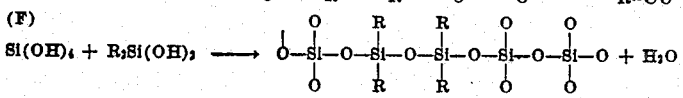

The reaction between the silica derivative and the organic substituted oxysilicon derivative may be carried out in various ways. The reactants may be heated together to produce the desired reaction. Or one of them may be hydrolyzed or partially hydrolyzed while still retaining substituent groups as indicated and reacted with the other component. Or they may be cohydrolyzed and heated to cause the reaction. As indicated above it is possible to use a hydrolyzed silicon tetrahalide for reaction with the oxysilicon having an organic group directly attached to silicon, particularly where the hydrolyzed tetrahalide is produced in the presence of the oxysilicon derivative or its hydrolysis product. It is also possible to utilize a hydrolysis product of an organic substituted silicon halide which may contain from 1 to 3 halogens attached to silicon and a substituent group R attached to silicon as illustrated above, which hydrolysis product still contains the R group for reaction with the orthosilicate derivative. Such organic substitued silicon halide may be utilized particularly by carrying out cohydrolysis of such halide in the presence of the silica derivative or derivatives employed. It has also been found that under some circumstances it is desirable to effect a partial reaction between the silica derivative and the organic substituted oxysilicon derivative and then hydrolyze the remaining material. Further silicon tetrahalides or organic substituted silicon halides may be present as reactants in the reaction mixtures containing the silica derivative and the organic substituted oxysilicon derivative, to produce products of complex structure. In this way a multiplicity of methods are available for producing products in accordance with the present invention and the following examples and considerations will illustrate some of these features. For example, formulations of the character just referred to may be illustrated by reactions in which a silicon tetrahalide is reacted with an organic substituted silicon hydroxide or a silicon tetroacylate is reacted with an organic substituted silicon halide as indicated in the following formulations:

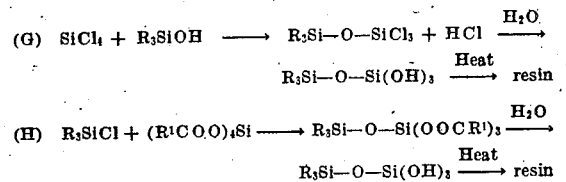

As representative of the silica derivatives particularly the class of esters there may be mentioned the orthosilicates of methyl, ethyl, butyl, phenyl, and the like, while the tetroacylates are illustrated by silicon tetraformate, silicon tetraacetate, silicon tetrabutyrate, etc.

As illustrative of the siliconates and alkoxy silicons there may be mentioned particularly ethyl silicons, ethane orthosiliconate, methyl methane orthosiliconate, ethyl propane orthosiliconate, ethyl butane orthosiliconate, hexyl triethoxy silane, allyl triethoxy silane, phenyl triethoxy silane, phenyl triphenoxy silane, benzyl triethoxy silane, phenyl ethynyl triethoxy silane, etc., triethyl silicon ethoxide, diethyl silicon diethoxide, dimethyl silicon diethoxide, dibutyl silicon diethoxide, etc. As the organic substituted silicon acylate there may be specifically mentioned dimethyl silicon diacetate, trimethyl silicon acetate, diethyl silicon diacetate, diethyl silicon dipropionate. As the organic substituted silicon hydroxides there may be particularly mentioned trimethyl silanol, triethyl silanol, tripropyl silanol, tri-isoamyl silanol, triphenyl silanol, tri-p-tolyl silanol, tribenzyl silanol, ethyl propyl phenyl silanol, diphenyl silanediol, dibenzyl silanediol, ethyl phenyl silanediol, ethyl benzyl silanediol, etc.

It has also been found under some circumstances that it is permissible to employ a silicon tetrahalide such as the chloride or bromide as the silica derivative in place of the silicon acylate or ester of orthosilicic acid for reaction with an oxysilicon having an organic group attached directly to silicon. In this case, however, halogen acids, acid halides and alkyl halides may be split off and consequently such reactions and processes may not be desired if neutral reacting conditions are needed. Further as exemplary of processes as set forth above, it is possible to hydrolyze together mixtures such as alkyl alkoxy silicons and ethyl orthosilicate. Thence on heating, water is split off to give clear hard resins.

The illustrations set forth above do not cover all possibilities comprehended within the scope of the present invention. The following will give a further partial list of compounds which may be coreacted and copolymerized. The list is not to be treated as comprehensive and many variations are possible in accordance with the teachings of the present invention. As indicated above, mixtures of the various types of compounds may be utilized so that one or more of the silica derivatives may be reacted with one or more of the oxysilicons having an organic group directly attached to silicon to produce very complex reaction products. Illustrating some specific examples, copolymers may be produced by following the specific examples given below utilizing ethyl orthosilicate reacted with ethyl silicon trihydroxide, methyl silicon trihydroxide, dimethyl silicon dihydroxide, trimethyl silicon hydroxide, diethyl silicon dihydroxide, or triethyl silicon hydroxide, or mixtures of two or more of these hydroxides. Or silicon tetroacetate may be reacted with trimethyl silicon hydroxide, dimethyl silicon hydroxide, triethyl silicon hydroxide, diethyl silicon dihydroxide, ethyl silicon trihydroxide, ethyl ethane orthosiliconate, methyl methane orthosiliconate, ethyl propane orthosiliconate, ethyl butane orthosiliconate, triethyl silicon ethoxide. diethyl silicon diethoxide, dimethyl silicon diethoxide, or dibutyl silicon diethoxide or combination of any two or more of these hydroxides and/or siliconates and/or ethoxides. Or ethyl orthosilicate may be reacted with dimethyl silicon diacetate, trimethyl silicon acetate, diethyl silicon diacetate, or diethyl silicon dipropionate, or any two or more of these acyl derivatives. Or mixtures of the silica derivatives may be reacted with mixtures of the oxysilicon derivatives as indicated above, thus ethyl orthosilicate together with silicon tetroacetate may be reacted with diethyl silicon dihydroxide, methyl methane orthosiliconate, and diethyl silicon diacetate. These will merely illustrate some of the combinations which are possible.

It will be seen that the above list gives only a very few of the large number of combinations possible under the processes of the present invention. While in the formulations and tabulations given above, monomeric silicon esters and acylates are indicated, partially hydrolyzed materials may be employed as well as partially hydrolyzed and condensed arkyl silicon derivatives. In addition, in lieu of monomeric materials, the monomeric materials may be replaced if desired by partially polymerized ingredients and as indicated, mixtures of monomeric materials and of partially polymerized materials may be utilized to produce variations in the copolymers in accordance with the present invention.

The two types of reactants or mixtures of several of each of the two groups of reactants may be employed in varying proportions. Where they are liquid they may be utilized in desired volume ratios with respect to one another, as for example, from 1 to 10 volumes of one of the reactants from the silica derivative group with from 10 to 1 volumes of the reactant or reactants from the organic substituted oxysilicon derivatives group. Or from 10 to 90% parts by weight of the derivative or derivatives of the silica derivatives group may be employed with from 90 to 10 parts by weight of the derivative or derivatives from the organic substituted oxysilicon derivatives groups. Or molar ratios may be employed, as for example, from 1 to 10 moles of the derivative or mixture of derivatives from the silica derivatives group with from 10 to 1 moles of the derivative or derivatives from the organic substituted oxysilicon derivatives group. The reaction of a single silica derivative with a single organic substituted oxysilicon derivative enables close control of the reaction product to be produced. More complex mixtures enable variation in properties to be obtained but as great control cannot be exercised as in those cases where the nature of the reactants is more limited.

As a general rule, an alkyl/silicon ratio of less than 2 will give hard resins, whereas an alkyl/silicon ratio of greater than 2 will give products that vary from flexible materials to oils. Varying ratios of from 0.5 to approximately 2.2 are illustrated in the examples.

In general the reaction is carried out by heating the components together at an elevated temperature desirably above 100° C. up to the boiling points of compounds involved but the temperatures employed should be below any decomposition temperatures. Depending on the nature of the materials employed the reaction temperatures may run up to high temperatures such as 300° C. and even higher and in some cases superatmospheric pressures may be employed to prevent undue vaporization or loss of materials before reaction. Where heat is used in hydrolytic polymerization, the temperature will be limited by that at which the solvent present refluxes, unless superatmospheric pressure is employed. The time involved will necessarily depend on the conditions of reaction and the materials undergoing treatment but is relatively short and may run from 2 or more hours to 16 hours and up. Where the materials are subjected to curing as in coatings, in molded products, and so forth, the temperatures and times may be from 100–300° C., and from 10 minutes to 4 hours respectively.

The products of the present invention may be utilized in a variety of ways. They may be partially polymerized, dissolved in a solvent and applied as a surface coating to metallic or wooden or other surfaces and thereafter completely converted by any suitable means such as application of heat to their final desired condition. They may be used to impregnate sheet material for electrical insulation, or they may be used in general as lacquers. They may be mixed with fillers, both organic and inorganic, and molded under heat and pressure. The materials of the invention may be used very satisfactorily as paints and as sanding sealers. They may be blended with other resins such as urea-formaldehyde, cumarone-indene, phenolic-aldheyde, alkyd resins, vinyl resins, styrene resins, allyl dibasic acid resins, acrylate and methacrylate resins, other organo silicon derivatives and resins, cellulose ethers such as ethyl cellulose, cellulose esters such as cellulose nitrate, cellulose acetate, cellulose acetate butyrate, etc., as well as with drying and semi-drying oils such as China-wood oil, linseed oil, perilla oil, and the like.

The following examples are given to illustrate the present invention.

*Example 1.*—Ethyl orthosilicate and water were mixed in a 1:1 molar ratio and sufficient absolute ethanol added to effect a clear homogeneous solution. The solution was refluxed for 3 hours, then the alcohol removed by distillation. A moderately viscous clear solution was obtained. One part by volume of the above partially hydrolyzed ethyl orthosilicate was mixed with one part by volume of the halide hydrolysis product of n-butyl silicon trihalide. The mixture on heating to 140° C. blended and a moderate evolution of gas occurred. When the gas evolution had subsided somewhat, the temperature was taken to 50° C. for 16 hours. A clear, rubbery gel was obtained which became a hard resin when heated at 140° C. When the components of this resin were merely mixed on a glass plate and heated quickly to 140° C., incompatibility resulted.

*Example 2.*—Equal volumes of the halide hydrolysis product of n-butyl silicon trihalide and ethyl orthosilicate were mixed together and heated to 140° C. An evolution of gas occurred. When the evolution of gas had diminished, a soft gel was obtained. On continued heating a hard rubbery gel was obtained.

*Example 3.*—One mole of ethyl orthosilicate and 2 moles of water were mixed together and sufficient alcohol added to give a clear solution. The solution was refluxed for 3 hours. A somewhat viscous product containing some silica was produced. This was mixed in equal volume proportions with the halide hydrolysis product of n-butyl silicon trihalide. On heating to 140° C. a hard, brittle, clear resin was obtained.

*Example 4.*—2 parts of an alkyl silicon hydroxide, made from 0.5 mole ethyl bromide, 0.75 mole n-butyl bromide and 1 mole of silicon tretrachloride by the one-step process followed by hydrolysis, were mixed with 1 part of ethyl orthosilicate and 3 parts of acetic anhydride. The solution was heated to boiling. It thickened rapidly and was poured into a mold. The mass set to a white gel which became a transparent, hard resin on heating up to 130° C. to eliminate the acetic anhydride and ethyl acetate which had formed.

*Example 5.*—This example concerns the copolymer of condensed ethyl silicate, ethyl silicon trichloride, and tetra acetoxysilane.

10.4 g. of condensed ethyl silicate, $(EtO)_4Si$, (.05 M), 16.4 g. of ethyl trichlorosilane, $EtSiCl_3$, (.1 M), and 12.8 g. of tetra acetoxysilane, $(AcO)_4Si$, (.05 M) were mixed with 100 cc. of dioxane and hydrolyzed by shaking with water. After standing for an hour, the hazy solution was extracted with ether. The ether layer was dried over anhydrous sodium sulphate. Films were poured on glass plates and placed in the oven at 160° C. In 60 minutes the plates showed hard, non-tacky, but flexible films. A casting of the silicone took an additional 2 hours at 180° C. to form a hard resin.

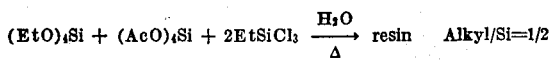

*Example 6.*—This example concerns the copolymer of ethyl silicate, diethyl diethoxysilane, and triethyl chlorosilane.

Diethyl diethoxysilane was made by placing 7.9 g. of diethyl dichlorosilane, $Et_2SiCl_2$, (.05 M) in 50 cc. of ether in a flask fitted with a motor-driven stirrer, a reflux condenser, and a dropping funnel. 5.2 g. of absolute ethyl alcohol (.1 M+10% excess) was added slowly with rapid stirring. After all the alcohol was added, the mixture was gently heated until no more HCl was evolved. The solvent and excess alcohol were removed under reduced pressure to leave diethyl diethoxysilane, $Et_2Si(OEt)_2$, behind.

10.8 g. (.075 M) of triethyl chlorosilane, $Et_3SiCl$, was hydrolyzed to the silicol in 50 cc. of dioxane containing 20 cc. of water, and then 8.8 g. (.05 M) of diethyl diethoxysilane, $Et_2Si(OEt)_2$ and 5.2 g. (.025 M) of ethyl silicate were added. The mixture was made alkaline with aqueous ammonia and heated for 30 minutes. The silicone was extracted with ether and a film poured on a glass plate. After 4 hours at 160° C. there was no visible curing of film.

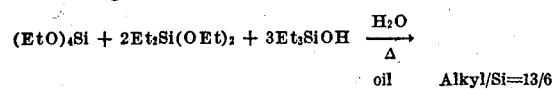

*Example 7.*—This example deals with the copolymer of diethyl diethoxysilane and ethyl silicate.

8.8 g. (.05 M) of diethyl diethoxysilane, $Et_2Si(OEt)_2$ as prepared above was co-hydrolyzed with 10.4 g. (.05 M) of ethyl silicate, $(EtO)_4Si$, by dissolving them in 50 cc. of dioxane, adding 20 cc. of water, and making the solution alkaline with aqueous ammonia. The mixture was then extracted with ether, washed with water, and dried over anhydrous sodium sulphate. A film was poured on glass from the ether solution and then put into the oven at 150° C. for 75 minutes. The resulting film was hard, colorless, and slightly brittle.

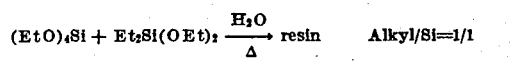

*Example 8.*—This example concerns the copolymer of diethyl diethoxysilane and tetra acetoxysilane.

8.8 g. (.05 M) of diethyl diethoxysilane, $Et_2Si(OEt)_2$, was mixed with 6.4 g. (0.25 M) of tetra acetoxysilane, $(AcO)_4Si$, in 75 cc. of dioxane and hydrolyzed with water. The mixture was extracted with ether. A film was poured on a glass plate which cured in 70 minutes at 175° C. to a hard, flexible film. From another sample the solvent was removed, and the silicone placed in a test tube which in turn was put into the oven at 160° C. It did not cure completely in one hour. Further heating for 2 hours at 180° C. yielded a hard, brittle resin.

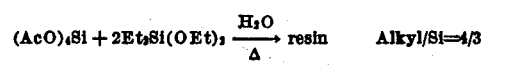

*Example 9.*—This example is concerned with the copolymer of ethyl tris (β-chlor propoxy) silane and tetra-acetoxysilane.

Ethyl tris (β-chlor propoxy) silane was mixed with 4.2 g. (.016 M) of tetra acetoxy silane, $(AcO)_4Si$, in 100 cc. of dioxane and hydrolyzed by shaking with water. The hydrolytic product was extracted with ether and films poured from the ether solution on glass plates. At 150° C. for 1½ hours the films cured to a hard, slightly brittle film. A casting of the silicone required 3 hours at 180° C. to cure to a hard resin.

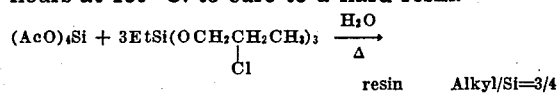

Having thus set forth my invention, I claim:

1. The method of producing a copolymer which comprises heating together separately hydrolyzed products including (1) a solution obtained by incompletely hydrolyzing a monovalent hydrocarbon orthosilicate with up to 2 moles of water and an organic liquid solvent in amount to give clear solution, and (2) a halogen-hydrolyzed, monovalent hydrocarbon silicon trihalide in which the halogen is completely hydrolyzed, in the molar ratio of said products to one another of 10:1 to 1:10 to form a gel.

2. The method of claim 1 in which the orthosilicate is an alkyl silicate.

3. The method of claim 1 in which the halide is an alkyl silicon trihalide.

4. The method of claim 1 in which the orthosilicate is an alkyl silicate and the halide is an alkyl silicon trihalide.

5. The method of claim 1 in which the orthosilicate is ethyl and the trihalide is n-butyl.

6. The method of claim 1 in which one mole of ethyl orthosilicate is heated with two moles of water and alcohol in amount to give clear solution, to produce a viscous product, an equal volume of the halogen hydrolysis product of n-butyl silicon trihalide is added, and the mixture heated to produce a resin.

JOHN B. RUST.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,258,220 | Rochow | Oct. 7, 1941 |
| 2,377,689 | Hyde | June 5, 1945 |
| 2,397,727 | Daudt | Apr. 2, 1946 |
| 2,397,895 | Warrick | Apr. 2, 1946 |
| 2,398,672 | Sauer | Apr. 16, 1946 |
| 2,410,346 | Hyde | Oct. 26, 1946 |
| 2,413,582 | Rust et al. | Dec. 21, 1946 |
| 2,438,478 | Hyde | Mar. 23, 1948 |
| 2,458,944 | Hyde | Jan. 11, 1949 |
| 2,460,457 | Hyde | Feb. 1, 1949 |
| 2,486,162 | Hyde | Oct. 25, 1949 |

FOREIGN PATENTS

| Number | Country | Date |
|---|---|---|
| 585,626 | Great Britain | Feb. 14, 1947 |

OTHER REFERENCES

Rochow: Chemistry of the Silicones, Wiley, 1946, pages 20 and 35.